Patented Feb. 14, 1950

2,497,483

UNITED STATES PATENT OFFICE 2,497,483

1-ACETYL-2-METHYL-2-CHLORO-METHYLCYCLOPROPANE

Kenneth E. Wilzbach, Chicago, Ill., assignor to United States Rubber Company, New York, N. Y., a corporation of New Jersey No Drawing. Application December 14, 1948, Serial No. 65,290

1 Claim. (Cl. 260—586)

This invention relates to a new chemical, denoted 1-acetyl-2-methyl-2-chloromethylcyclopropane, subscribing to the formula

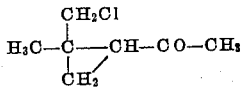

The chemical can be prepared by the reaction of 4,4-di(chloromethyl)-2-pentanone with alkali, illustrated as follows:

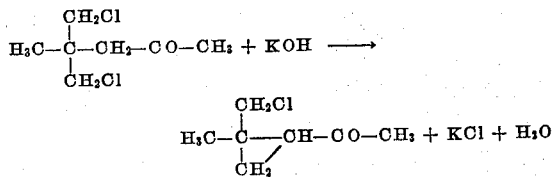

The occurrence of this reaction is particularly surprising since the chlorine substituents are of the neo-pentyl type, in which chloromethyl is linked to a quaternary carbon atom. Such compounds generally display little, if any, reactivity toward alkaline reagents. Nevertheless, I have found that 4,4-di(chloromethyl)-2-pentanone reacts readily with alkali, to yield a 1-acetyl-2-methyl-2-chloromethylcyclopropane. Moreover, this product is obtained in essentially quantitative yields unaccompanied by any significant amount of such a conceivable by-product as 3-chloro-methyl-3-methylcyclopentanone.

In the practice of my invention, the 4,4-di(chloromethyl)-2-pentanone is treated, e. g., at 25–80° C. with one or more, e. g., one to five, molar equivalents of an inorganic alkaline material, preferably an alkali metal hydroxide, e. g., sodium hydroxide, potassium hydroxide. The reaction can be conducted in the presence of a diluent, preferably a solvent which homogenizes the reactant mixture, e. g., ethanol. The reaction product can be isolated and purified by fractional distillation. This new compound is of particular utility as a synthetic intermediate. For example, it can be hydrolyzed to 1-acetyl-2-methyl-2-hydroxy methylcyclopropane which upon oxidation with permanganate yields 2-acetyl-1-methylcyclopropane-carboxylic acid. The latter is readily converted by further oxidation to the known compound, trans-2-methyl-cyclopropane-1,2-dicarboxylic acid, M. 168° C.

The following examples disclose my invention in more detail.

EXAMPLE 1

Preparation of 4,4-di(chloromethyl)-2-pentanone

Seven grams of 2-methyl-4,4-di(chloromethyl)-1-pentene are dissolved in 100 ml. of commercial 90% formic acid and a stream of oxygen containing 6% of ozone is introduced into the solution at 0° C. at a rate of 140 ml./minute for a period of 3 hours. The solution is then diluted with 50 g. of water, neutralized with aqueous alkali, and extracted with diethyl ether. The extract is dried and fractionally distilled to yield about 6.5 g. of 4,4-di(chloromethyl)-2-pentanone, B. 74–75° C./3 mm; $n_D^{20}$ 1.4705; sp. gr. (20/20) 1.159.

EXAMPLE 2

A solution of 9.15 g. of 4,4-di(chloromethyl)-2-pentanone and 3.1 g. of potassium hydroxide in 70 ml. of 95% aqueous ethanol is heated at 60° C. for about 40 minutes. Excess base is then neutralized with hydrogen chloride, the mixture is cooled and filtered, and the filtrate is fractionally distilled to yield 7.0 g. of 1-acetyl-2-methyl-2-chloromethylcyclopropane, B. 71–72° C./14 mm.; $n_D^{20}$ 1.4625.

| Analysis | Percent Carbon | Percent Hydrogen | Percent Chlorine |
|---|---|---|---|
| Found | 57.23 | 7.50 | 23.71 |
| Theory | 57.31 | 7.56 | 24.16 |

Having thus described my invention, what I claim and desire to protect by Letters Patent is:

As a new compound 1-acetyl-2-methyl-2-chloromethylcyclopropane.

KENNETH E. WILZBACH.

REFERENCES CITED

The following references are of record in the file of this patent:

UNITED STATES PATENTS

| Number | Name | Date |
|---|---|---|
| 2,419,259 | Forman | Apr. 22, 1947 |

OTHER REFERENCES

Wolgemuth, Annales de Chimie, Series 9, vol. 3, pages 141–154 (1915).